(12) United States Patent
Sakamoto

(10) Patent No.: US 9,478,352 B2
(45) Date of Patent: Oct. 25, 2016

(54) ELECTRONIC APPARATUS, METHOD, AND STORAGE MEDIUM

(71) Applicant: CANON KABUSHIKI KAISHA, Tokyo (JP)

(72) Inventor: Hiromichi Sakamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 656 days.

(21) Appl. No.: 13/705,354

(22) Filed: Dec. 5, 2012

(65) Prior Publication Data

US 2013/0147282 A1 Jun. 13, 2013

(30) Foreign Application Priority Data

Dec. 8, 2011 (JP) ................................ 2011-269333

(51) Int. Cl.
*H01F 38/14* (2006.01)
*H02J 7/02* (2016.01)

(52) U.S. Cl.
CPC .............. *H01F 38/14* (2013.01); *H02J 7/025* (2013.01)

(58) Field of Classification Search
CPC .......... H02J 5/005; H02J 7/025; H02J 17/00; H01F 38/14; B60L 11/182
USPC .......................................................... 307/104
See application file for complete search history.

(56) References Cited

U.S. PATENT DOCUMENTS

| 8,527,786 | B2 | 9/2013 | Nakano |
| 8,810,195 | B2 | 8/2014 | Mochida et al. |
| 2007/0057073 | A1 | 3/2007 | Mamba et al. |
| 2009/0058361 | A1* | 3/2009 | John ............................. 320/128 |
| 2009/0206674 | A1* | 8/2009 | Noguchi ............. A61B 19/0248 307/104 |
| 2009/0271047 | A1* | 10/2009 | Wakamatsu ............ H02J 5/005 700/295 |
| 2009/0322280 | A1* | 12/2009 | Kamijo et al. ................. 320/108 |
| 2010/0033018 | A1* | 2/2010 | Fukasawa et al. .............. 307/80 |
| 2010/0264746 | A1* | 10/2010 | Kazama .................. H02J 7/025 307/104 |
| 2011/0025265 | A1 | 2/2011 | Mochida et al. |
| 2011/0050164 | A1* | 3/2011 | Partovi et al. ................. 320/108 |
| 2011/0063458 | A1* | 3/2011 | Washisu et al. ........... 348/208.2 |
| 2011/0218402 | A1* | 9/2011 | Sato et al. ..................... 600/160 |
| 2011/0244794 | A1* | 10/2011 | Nakano .................... H02J 7/025 455/41.1 |
| 2011/0264297 | A1 | 10/2011 | Nakano |
| 2012/0001485 | A1* | 1/2012 | Uchida .................... H02J 5/005 307/11 |
| 2012/0001497 | A1* | 1/2012 | Sada ....................... H02J 5/005 307/104 |
| 2012/0223593 | A1* | 9/2012 | Kamata .................... H02J 7/025 307/104 |
| 2012/0242160 | A1* | 9/2012 | Tseng .................. H04B 5/0037 307/104 |

(Continued)

FOREIGN PATENT DOCUMENTS

CN 101983466 A 3/2011
CN 102237726 A 11/2011

(Continued)

*Primary Examiner* — Thienvu Tran
*Assistant Examiner* — Brian K Baxter
(74) *Attorney, Agent, or Firm* — Canon USA, Inc. IP Division

(57) ABSTRACT

An electronic apparatus includes a first power receiving unit that wirelessly receives power from a power supply apparatus, and a control unit that supplies, to the power supply apparatus, data for controlling supply of power from the power supply apparatus according to a mode of the electronic apparatus.

24 Claims, 7 Drawing Sheets

(56) References Cited

U.S. PATENT DOCUMENTS

| | | | | |
|---|---|---|---|---|
| 2012/0262000 A1* | 10/2012 | Urano | | 307/104 |
| 2012/0267961 A1* | 10/2012 | Endo et al. | | 307/104 |
| 2012/0297217 A1* | 11/2012 | Lee et al. | | 713/320 |
| 2012/0329405 A1* | 12/2012 | Lee | H02J 17/00 | 455/73 |
| 2013/0002038 A1* | 1/2013 | Lee | H02J 7/00 | 307/104 |
| 2013/0015813 A1* | 1/2013 | Kim | H02J 7/00 | 320/108 |
| 2013/0057078 A1* | 3/2013 | Lee | H02J 7/00 | 307/104 |
| 2013/0154382 A1* | 6/2013 | Kurata et al. | | 307/104 |
| 2013/0207602 A1* | 8/2013 | Fukaya | | 320/108 |

FOREIGN PATENT DOCUMENTS

| | | |
|---|---|---|
| JP | 2002-247186 A | 8/2002 |
| JP | 2007-142825 A | 6/2007 |
| JP | 2008-206297 A | 9/2008 |
| JP | 2009-505625 A | 2/2009 |
| JP | 2009-194873 A | 8/2009 |
| JP | 2009-213351 A | 9/2009 |
| JP | 2009-251895 A | 10/2009 |
| JP | 2009-290928 A | 12/2009 |

* cited by examiner

FIG.4

| Pacc | Pchg | POWER RECEIVING ANTENNA TO BE SELECTED |
|---|---|---|
| 0 | 0 | |
| 0 | 1 | POWER RECEIVING ANTENNA 118 OF ELECTRONIC APPARATUS 100 |
| 1 | 0 | |
| 1 | 1 | POWER RECEIVING ANTENNA 202 OF EXTERNAL APPARATUS 200 |

FIG.5

| Pmode | CONTROL PARAMETER |
|---|---|
| 0 | DRIVING CURRENT 1.0 [A], DRIVING FREQUENCY 200 [kHz] (PRIORITIZATION OF POWER SUPPLY) |
| 1 | INHIBITION OF POWER SUPPLY |

FIG.6

| Pchg | Pmode | CONTROL PARAMETER |
|---|---|---|
| 0 | 0 | DRIVING CURRENT 1.5 [A], DRIVING FREQUENCY 200 [kHz] (PRIORITIZATION OF POWER SUPPLY) |
| 0 | 1 | DRIVING CURRENT 1.5 [A], DRIVING FREQUENCY 300 [kHz] (PRIORITIZATION OF OPERATION) |
| 1 | 0 | DRIVING CURRENT 1.0 [A], DRIVING FREQUENCY 400 [kHz] (PRIORITIZATION OF POWER SUPPLY) |
| 1 | 1 | |

ELECTRONIC APPARATUS, METHOD, AND STORAGE MEDIUM

BACKGROUND OF THE INVENTION

1. Field of the Invention

The present invention relates to an electronic apparatus for receiving power wirelessly supplied, a method, and a storage medium.

2. Description of the Related Art

In recent years, there has been known a system including a power supply apparatus supplying power without a connector through electromagnetic induction and an electronic apparatus receiving the power from the power supply apparatus through electromagnetic induction. Japanese Patent Application Laid-Open No. 2009-290928 discusses such a system in which an electronic apparatus including a secondary coil for receiving power from a power supply apparatus charges a battery using the power received by the secondary coil from the power supply apparatus.

The secondary coil for receiving power from a power supply apparatus has been provided at a specific position in an electronic apparatus. For this reason, internal circuits in the electronic apparatus are sometimes affected by power supplied from the power supply apparatus when the electronic apparatus is supplied with the power using the secondary coil. This causes a problem that the power supplied from the power supply apparatus inhibits the electronic apparatus from being normally operated in a case where the electronic apparatus operates the internal circuits when being supplied with the power using the secondary coil.

SUMMARY OF THE INVENTION

The present invention is directed to supplying an electronic apparatus with power from a power supply apparatus without inhibiting the operation of the electronic apparatus by the power supplied from the power supply apparatus to the electronic apparatus.

According to an aspect of the present invention, an electronic apparatus includes a first power receiving unit that wirelessly receives power from a power supply apparatus, and a control unit that supplies, to the power supply apparatus, control data for controlling supply of power from the power supply apparatus based on a mode of the electronic apparatus.

According to another aspect of the present invention, a method for controlling an electronic apparatus includes wirelessly receiving power from a power supply apparatus, and supplying, to the power supply apparatus, control data for controlling supply of power from the power supply apparatus based on a mode of the electronic apparatus.

According to yet another aspect of the present invention, a computer-readable storage medium stores a program that causes a computer to execute a method for controlling an electronic apparatus, in which the method includes wirelessly receiving power from a power supply apparatus, and supplying, to the power supply apparatus, control data for controlling supply of power from the power supply apparatus based on a mode of the electronic apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a chart illustrating an example of a selection table according to the first exemplary embodiment.

FIG. 5 is a chart illustrating an example of a first parameter selection table according to the first exemplary embodiment.

FIG. 6 is a chart illustrating an example of a second parameter selection table according to the first exemplary embodiment.

DESCRIPTION OF THE EMBODIMENTS

Various exemplary embodiments, features, and aspects of the invention will be described in detail below with reference to the drawings.

Figure 1A:
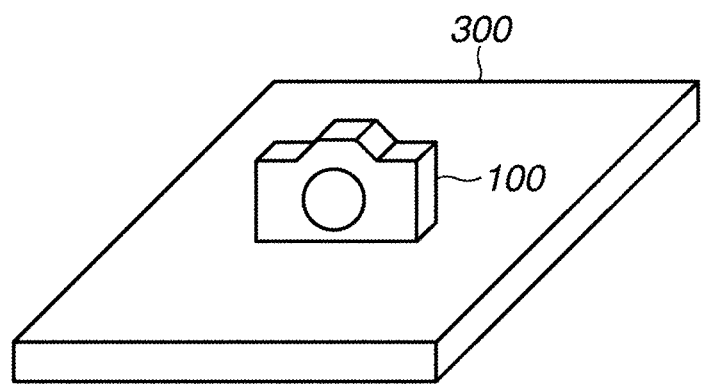
FIGS. 1A and 1B illustrate examples of a power supply system according to a first exemplary embodiment.
Figure 1B:
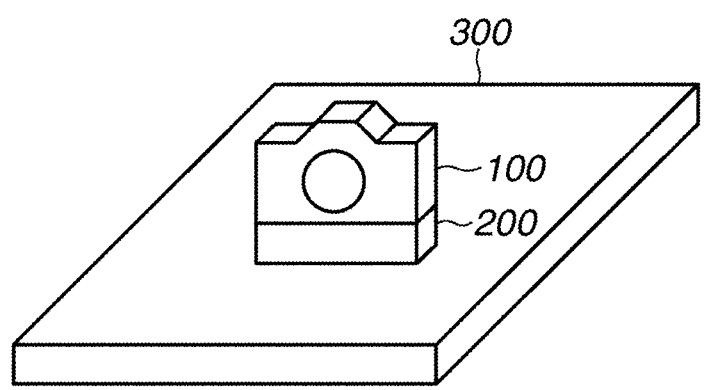

As illustrated in FIGS. 1A and 1B, a charging system according to a first exemplary embodiment includes a power supply apparatus 300, an electronic apparatus 100, and an external apparatus 200.

In the charging system according to the first exemplary embodiment, as illustrated in FIG. 1A, for example, in a case where the electronic apparatus 100 is placed on the power supply apparatus 300, the power supply apparatus 300 wirelessly supplies power to the electronic apparatus 100 via a power supply antenna. Also in a case where a distance between the power supply apparatus 300 and the electronic apparatus 100 is present within a predetermined range, the electronic apparatus 100 having a power receiving antenna 118 wirelessly receives power supplied from the power supply apparatus 300 via the power receiving antenna 118. The electronic apparatus 100 charges a battery 119 attached to the electronic apparatus 100 using the power received from the power supply apparatus 300 via the power receiving antenna 118. In a case where the distance between the power supply apparatus 300 and the electronic apparatus 100 is not present within a predetermined range, even if the electronic apparatus 100 has the power receiving antenna 118, the electronic apparatus 100 cannot receive power from the power supply apparatus 300.

In FIG. 1B, the electronic apparatus 100 to which the external apparatus 200 is attached is placed on the power supply apparatus 300. In such a system, the power supply apparatus 300 wirelessly supplies power to the electronic apparatus 100 and the external apparatus 200 via a power supply antenna 305. In a case where the distance between the power supply apparatus 300 and the electronic apparatus 100 is present within the predetermined range, the electronic apparatus 100 having the power receiving antenna 118 wirelessly receives power supplied from the power supply apparatus 300 via the power receiving antenna 118. The electronic apparatus 100 charges at least one of the battery 119 attached to the electronic apparatus 100 and a battery 203 attached to the external apparatus 200 using the power received from the power supply apparatus 300 via the power receiving antenna 118. In a case where the distance between the power supply apparatus 300 and the electronic apparatus 100 is not present within a predetermined range, even if the electronic apparatus 100 has the power receiving antenna 118, the electronic apparatus 100 cannot receive power from the power supply apparatus 300.

In the charging system illustrated in FIG. 1B, in a case where the distance between the power supply apparatus 300 and the external apparatus 200 is present within a predetermined range, the external apparatus 200 having a power receiving antenna 202 wirelessly receives power supplied from the power supply apparatus 300 via the power receiving antenna 202. The external apparatus 200 having the power receiving antenna 202 can charge the battery 203 using the power wirelessly received from the power supply apparatus 300 via the power receiving antenna 202 and supply the electronic apparatus 100 with the power received from the power supply apparatus 300 via the power receiving antenna 202. In a case where the distance between the power supply apparatus 300 and the external apparatus 200 is not present within a predetermined range, even if the external apparatus 200 has the power receiving antenna 202, the external apparatus 200 cannot receive power from the power supply apparatus 300.

If the external apparatus 200 does not have the power receiving antenna 202, the external apparatus 200 cannot receive the power transmitted from the power supply apparatus 300. For this reason, if the external apparatus 200 is supplied with the power received by the electronic apparatus 100 from the power supply apparatus 300, the external apparatus 200 charges the battery 203 included in the external apparatus 200.

The term "predetermined range" refers to a range within which the electronic apparatus 100 and the external apparatus 200 can receive power from the power supply apparatus 300.

It is assumed that the power supply apparatus 300 can wirelessly supply power to the electronic apparatus 100 and the external apparatus 200 in parallel. Although the power supply apparatus 300 can supply power to at least one of the electronic apparatus 100 and the external apparatus 200 in a case where at least one of the electronic apparatus 100 and the external apparatus 200 is placed on the power supply apparatus 300, the present invention is not limited to this configuration. For example, in a case where at least one of the electronic apparatus 100 and the external apparatus 200 is leaned against the power supply apparatus 300, the power supply apparatus 300 may supply power to at least one of the electronic apparatus 100 and the external apparatus 200.

An example of a configuration of the electronic apparatus 100 is described below with reference to FIG. 2.

A digital still camera is cited as an example of the electronic apparatus 100 in the description.

The electronic apparatus 100 includes connection units 101, 102, 103, 104, and 105, a system control unit 106, an imaging circuit 107, an analog to digital (AD) conversion circuit 108, a distance measurement circuit 109, a light metering circuit 110, and a flash light control circuit 111. The electronic apparatus 100 further includes an audio circuit 112, a video circuit 113, a recording unit 114, a display unit 115, and a non-volatile memory 116. The electronic apparatus 100 still further includes a geomagnetic sensor 117, the power receiving antenna 118, the battery 119, a power source control circuit 120, a communication circuit 121, a driving circuit 122, a switching circuit 123, and an operation unit 124.

The connection unit 101 includes a terminal (connector) for connecting the electronic apparatus 100 to the external apparatus 200. If the electronic apparatus 100 is connected to the external apparatus 200, the connection unit 101 is used for supplying a control signal for controlling the external apparatus 200 and power to the external apparatus 200 from the electronic apparatus 100. Furthermore, if the electronic apparatus 100 is connected to the external apparatus 200, the connection unit 101 is used for supplying a control signal for controlling the electronic apparatus 100 and power to the electronic apparatus 100 from the external apparatus 200.

The connection unit 102 includes a terminal for connecting a portrait photographing adaptor.

The connection unit 103 includes a terminal for connecting an external flash unit.

The connection unit 104 includes a terminal for connecting a wireless local area network (LAN) unit (not illustrated) for causing the electronic apparatus 100 to realize a function to perform the wireless LAN communication.

The connection unit 105 includes a terminal for connecting a Global Positioning System (GPS) unit for causing the electronic apparatus 100 to realize a function to perform GPS communication.

The system control unit 106 controls the electronic apparatus 100 using a computer program stored in the non-volatile memory 116. The system control unit 106 also controls the electronic apparatus 100 according to instructions input by a user via the operation unit 124.

The imaging circuit 107 is a circuit for generating analog data from an optical image of an object. The imaging circuit 107 includes an image sensor for generating analog data from an optical image of an object which is imaged by an optical lens (not illustrated). The analog data generated by the imaging circuit 107 are supplied to the AD conversion circuit 108.

The AD conversion circuit 108 performs AD conversion to convert the analog data supplied from the imaging circuit 107 to digital data. The digital data generated by the AD conversion circuit 108 are supplied to an image processing unit (not illustrated) included in the system control unit 106 and subjected to image processing by the image processing unit. The digital data subjected to the image processing by the image processing unit are supplied to the recording unit 114 and recorded in a recording medium 114a by the recording unit 114.

The distance measurement circuit 109 is a circuit for measuring a distance to an object. The system control unit 106 performs a distance-measurement calculation process based on the distance to the object measured by the distance measurement circuit 109 to control the position of the optical lens (not illustrated). The distance measurement circuit 109 is used for causing the electronic apparatus 100 to perform an auto-focus process.

The light metering circuit 110 is a circuit for measuring the illuminance of the object. The system control unit 106 performs a light metering calculation process based on the illuminance of the object measured by the light metering circuit 110 to control the brightness of the object and shutter speed. The light metering circuit 110 is used for causing the electronic apparatus 100 to perform an auto-exposure process.

The flash light control circuit 111 is a circuit for measuring the light-emission amount of a flash unit (not illustrated). The system control unit 106 performs a flash light control calculation process based on the light-emission amount of the flash unit measured by the flash light control circuit 111.

The audio circuit 112 is a circuit for inputting and outputting audio data. The audio circuit 112 includes a microphone and a loudspeaker, for example. The audio circuit 112 can output audio data read from the recording medium 114a by the recording unit 114 to the loudspeaker. The audio circuit 112 generates audio data from analog audio information input via the microphone and supplies the audio data to the recording unit 114. The recording unit 114 records the audio data supplied from the audio circuit 112 in the recording medium 114a.

The video circuit 113 generates display data to be displayed on the display unit 115 from any one of the video data read from the recording medium 114a by recording unit 114 and the video data subjected to image processing by the image processing unit of the system control unit 106. The video circuit 113 generates display data to be displayed on the display unit 115 or an external display from the video data previously stored in the non-volatile memory 116. The display data generated by the video circuit 113 are supplied to the display unit 115 or an external display connected to the electronic apparatus 100.

The recording unit 114 records the audio data supplied from the audio circuit 112 in the recording medium 114a. The recording unit 114 records the video data supplied from the image processing unit of the system control unit 106 in the recording medium 114a. The recording unit 114 supplies the video circuit 113 with the video data recorded in the recording medium 114a. The recording unit 114 supplies the audio circuit 112 with the audio data recorded in the recording medium 114a.

The recording medium 114a may be an external memory which is detachable from or incorporated into the electronic apparatus 100. The recording medium 114a may be a CompactFlash (CF) (registered trademark) card, a Secure Digital (SD) card, or a hard disk device.

The display unit 115 displays the display data supplied from the video circuit 113. The display unit 115 is a liquid crystal display, for example.

The non-volatile memory 116 stores computer programs executed by the system control unit 106 and parameters for calculation performed by the system control unit 106. The non-volatile memory 116 stores flags for operation performed by the electronic apparatus 100. The non-volatile memory 116 also stores identification information such as the identification (ID) of the electronic apparatus 100 and information about power which the electronic apparatus 100 can receive from the power supply apparatus 300. The non-volatile memory 116 also stores a selection table illustrated in FIG. 4, a first parameter selection table illustrated in FIG. 5, and a second parameter selection table illustrated in FIG. 6. The selection table in FIG. 4, the first parameter selection table in FIG. 5, and the second parameter selection table in FIG. 6 are described below. The non-volatile memory 116 stores device information about external apparatuses connected with at least one of the connection units 101, 102, 103, 104, and 105.

The geomagnetic sensor 117 is a sensor for detecting a direction by detecting magnetism. Direction information which indicates the direction detected by the geomagnetic sensor 117 is supplied to the system control unit 106. The system control unit 106 may display an icon indicating the direction and video data which are superimposed on the video data displayed on the display unit 115 using the direction information supplied by the geomagnetic sensor 117. The system control unit 106 may associate the direction information supplied by the geomagnetic sensor 117 with the video and audio data recorded on the recording medium 114a.

The power receiving antenna 118 is an antenna for receiving power supplied from the power supply apparatus 300. The electronic apparatus 100 receives power supplied from the power supply apparatus 300 via the power receiving antenna 118. The power received from the power supply apparatus 300 by the power receiving antenna 118 is supplied to the driving circuit 122. The power receiving antenna 118 may be a helical antenna, a loop antenna, or a plane antenna such as a meander line antenna. The system control unit 106 adjusts current flowing to the power receiving antenna 118 to allow controlling magnetic and electric field coupling between the power receiving antenna 118 and the power supply antenna 305.

The battery 119 is detachable from the electronic apparatus 100. The battery 119 is a chargeable secondary battery such as a lithium ion battery, for example. The battery 119 can supply power to the entire electronic apparatus 100.

If the electronic apparatus 100 is in a charge mode, the power source control circuit 120 generates a desired voltage from a direct-current power supplied from the driving circuit 122 via the switching circuit 123. In this case, the power source control circuit 120 supplies the generated desired voltage to the electronic apparatus 100. The power source control circuit 120 supplies the desired voltage to the electronic apparatus 100 according to the operation modes of the electronic apparatus 100. The power source control circuit 120 includes a switching regulator or a linear regulator, for example.

If the electronic apparatus 100 is in the charge mode, the power source control circuit 120 charges the battery 119 using the direct-current power supplied from the driving circuit 122 via the switching circuit 123. If the electronic apparatus 100 is in the charge mode, the power source control circuit 120 charges the battery 203 included in the external apparatus 200 using the direct-current power supplied from the driving circuit 122 via the switching circuit 123. The power source control circuit 120 charges at least one of the battery 119 and the battery 203 by a constant voltage constant current method. The power source control circuit 120 periodically detects information indicating remaining capacity of the battery 119 attached to the electronic apparatus 100, notifies the system control unit 106 of the information, periodically detects information indicating remaining capacity of the battery 203 attached to the external apparatus 200, and notifies the system control unit 106 of the information. If the battery 119 is fully charged while the power source control circuit 120 is charging the battery 119, the power source control circuit 120 notifies the system control unit 106 that the battery 119 is fully charged. If the battery 203 is fully charged while the power source control circuit 120 is charging the battery 203, the power source control circuit 120 notifies the system control unit 106 that the battery 203 is fully charged.

If the electronic apparatus 100 is in a mode other than the charge mode, the power source control circuit 120 generates a desired voltage from at least one of the power supplied from the battery 119 and the power supplied from the external apparatus 200 via the connection unit 101 and supplies the desired voltage to the electronic apparatus 100.

The communication circuit 121 is a circuit for communicating with the power supply apparatus 300 via the power receiving antenna 118 and the driving circuit 122. The communication circuit 121 transmits information and a command to the power supply apparatus 300 via the power receiving antenna 118 and the driving circuit 122. The communication circuit 121 receives information and the command transmitted from the power supply apparatus 300 via the power receiving antenna 118 and the driving circuit 122. The information and the command received by the communication circuit 121 are supplied to the system control unit 106, and the system control unit 106 controls the electronic apparatus 100 according to the information and the command supplied from the communication circuit 121. The communication circuit 121 communicates with the power supply apparatus 300 based on a predetermined communication protocol. The term "predetermined communication protocol" refers to a communication protocol conforming to the International Standard Organization/International Electrotechnical Commission (ISO/IEC) 18092 standard such as Radio Frequency Identification (RFID), for example. The predetermined communication protocol may be a communication protocol of an integrated circuit (IC) tag and a tag reader such as Felica (registered trademark) or Mikron Fare-collection System (MIFARE) (registered trademark). The predetermined communication protocol may be a communication protocol using communication protocol.

The driving circuit 122 generates a direct-current power from the power supplied from the power receiving antenna 118 and supplies the generated direct-current power to the power source control circuit 120 via the switching circuit 123. The driving circuit 122 may supply the generated direct-current power to the external apparatus 200 via the connection unit 101. The driving circuit 122 includes a rectifier diode for generating the direct-current power from the power supplied from the power receiving antenna 118.

The driving circuit 122 includes a matching circuit for performing impedance matching and a resonance circuit for resonating the power receiving antenna 118 at the same frequency as the resonance frequency of the power supply apparatus 300. The system control unit 106 controls the driving circuit 122 to allow the power supply apparatus 300 to be resonated with the electronic apparatus 100. The system control unit 106 controls elements such as a coil, a capacitor, and a resistor included in the driving circuit 122 so that the power receiving antenna 118 resonates at the same frequency as the resonance frequency of the power supply apparatus 300. The system control unit 106 controls the frequency of the power receiving antenna 118 to allow controlling magnetic and electric field coupling between the power receiving antenna 118 and the power supply antenna 305.

The switching circuit 123 is a switch for connecting the driving circuit 122 to the power source control circuit 120. The switching circuit 123 is also a switch for connecting the driving circuit 122 to the connection unit 101.

The system control unit 106 turns on the switching circuit 123 to connect the driving circuit 122 to the power source control circuit 120. The system control unit 106 turns off the switching circuit 123 to disconnect the driving circuit 122 from the power source control circuit 120. If the switching circuit 123 is turned on, the power source control circuit 120 is supplied with the power received from the power supply apparatus 300 by the power receiving antenna 118. If the switching circuit 123 is turned off, the power source control circuit 120 is not supplied with the power received from the power supply apparatus 300 by the power receiving antenna 118.

When the external apparatus 200 is connected to the electronic apparatus 100 via the connection unit 101, the system control unit 106 can turn on the switching circuit 123 to connect the driving circuit 122 to the external apparatus 200. When the external apparatus 200 is connected to the electronic apparatus 100 via the connection unit 101, the system control unit 106 can turn off the switching circuit 123 to disconnect the driving circuit 122 from the external apparatus 200.

The switching circuit 123 may use a relay switch or a switch previously included in the electronic apparatus 100.

The operation unit 124 provides a user interface for operating the electronic apparatus 100. The operation unit 124 includes a power source button for operating the electronic apparatus 100 and a mode selection button for switching the operation mode of the electronic apparatus 100. Each button includes a switch and a touch panel. The system control unit 106 controls the electronic apparatus 100 according to instructions input by the user via the operation unit 124. The operation unit 124 may be the one that controls the electronic apparatus 100 according to a remote control signal received from a remote controller (not illustrated).

The electronic apparatus 100 may be a mobile apparatus such as a digital still camera, a mobile phone with a camera, a digital video camera, and a smartphone, provided that the electronic apparatus 100 is the one that is operated by the power supplied from the battery 119. Alternatively, the electronic apparatus 100 may be a reproduction apparatus such as a player for reproducing audio data or video data or a display apparatus such as a television set. Still alternatively, the electronic apparatus 100 may be a moving apparatus such as a vehicle driven by power supplied from the battery 119.

If the battery 119 is not attached to the electronic apparatus 100, the electronic apparatus 100 may be the one that is operated by the power supplied from the power supply apparatus 300.

An example of a configuration of the external apparatus 200 is described below with reference to FIG. 2.

An accessory to the electronic apparatus 100 is cited as an example of the external apparatus 200 in the description.

The external apparatus 200 includes a connection unit 201, a power receiving antenna 202, a battery 203, a communication circuit 204, a driving circuit 205, and a switching circuit 206.

The connection unit 201 includes a terminal for connecting the external apparatus 200 to the electronic apparatus 100. If the electronic apparatus 100 is connected to the external apparatus 200, the connection unit 201 is used for supplying a control signal for controlling the electronic apparatus 100 and power to the electronic apparatus 100 from the external apparatus 200.

Furthermore, if the electronic apparatus 100 is connected to the external apparatus 200, the connection unit 201 is used for supplying a control signal for controlling the external apparatus 200 and power to the external apparatus 200 from the electronic apparatus 100.

The power receiving antenna 202 is an antenna for receiving power supplied from the power supply apparatus 300. The external apparatus 200 receives power supplied from the power supply apparatus 300 via the power receiving antenna 202. The power received from the power supply apparatus 300 by the power receiving antenna 202 is supplied to the driving circuit 205. The power receiving antenna 202 may be a helical antenna, a loop antenna, or a plane antenna such as a meander line antenna. The system control unit 106 adjusts current flowing to the power receiving antenna 202 to allow controlling magnetic and electric field coupling between the power receiving antenna 202 and the power supply antenna 305.

The battery 203 is detachable from the external apparatus 200. The battery 203 is a chargeable secondary battery such as a lithium ion battery, for example. The battery 203 can supply power to the electronic apparatus 100.

The communication circuit 204 is a circuit for communicating with the power supply apparatus 300 via the power receiving antenna 202 and the driving circuit 205. The communication circuit 204 transmits information and a command to the power supply apparatus 300 via the power receiving antenna 202 and the driving circuit 205. The communication circuit 204 receives information and a command transmitted from the power supply apparatus 300 via the power receiving antenna 202 and the driving circuit 205. The information and command received by the communication circuit 204 are supplied to the system control unit 106, and the system control unit 106 controls the electronic apparatus 100 according to the information and command supplied from the communication circuit 204. The communication circuit 204 communicates with the power supply apparatus 300 according to a predetermined communication protocol, as is the case with the communication circuit 121.

The driving circuit 205 generates a direct-current power according to the power supplied from the power receiving antenna 202 and supplies the generated direct-current power to the power source control circuit 120 via the switching circuit 206 and the connection unit 201. The driving circuit 205 includes a rectifier diode for generating the direct-current power from the power supplied from the power receiving antenna 202.

The driving circuit 205 includes a matching circuit for performing impedance matching and a resonance circuit for resonating the power receiving antenna 202 at the same frequency as the resonance frequency of the power supply apparatus 300. The system control unit 106 controls the driving circuit 205 to allow the power supply apparatus 300 to be resonated with the external apparatus 200. The system control unit 106 controls elements such as a coil, a capacitor, and a resistor included in the driving circuit 205 so that the power receiving antenna 202 resonates at the same frequency as the resonance frequency of the power supply apparatus 300. The system control unit 106 controls the frequency of the power receiving antenna 202 to allow controlling magnetic and electric field coupling between the power receiving antenna 202 and the power supply antenna 305.

The switching circuit 206 is a switch for connecting the driving circuit 205 with the power source control circuit 120.

The system control unit 106 turns on the switching circuit 206 to connect the driving circuit 205 to the power source control circuit 120. The system control unit 106 turns off the switching circuit 206 to disconnect the driving circuit 205 from the power source control circuit 120. If the external apparatus 200 is connected to the electronic apparatus 100 via the connection unit 101 and the switching circuit 123 is turned on, the power source control circuit 120 is supplied with the power received from the power supply apparatus 300 by the power receiving antenna 202. If the external apparatus 200 is connected to the electronic apparatus 100 via the connection unit 101 and the switching circuit 123 is turned off, the power source control circuit 120 is not supplied with the power received from the power supply apparatus 300 by the power receiving antenna 202. If the external apparatus 200 is not connected to the electronic apparatus 100 via the connection unit 101, but even if the switching circuit 123 is turned on, the power received from the power supply apparatus 300 by the power receiving antenna 202 is not supplied.

The external apparatus 200 may be the one other than the accessory to the electronic apparatus 100. The external apparatus 200 may be one used for shooting performed by the electronic apparatus 100. The external apparatus 200 may be one regarding operation performed by the electronic apparatus 100.

An example of a configuration of the power supply apparatus 300 is described below with reference to FIG. 2.

The power supply apparatus 300 includes a system control unit 301, a conversion circuit 302, a power supply circuit 303, a communication circuit 304 and a power supply antenna 305.

The system control unit 301 controls the power supply apparatus 300 using the computer program stored in a non-volatile memory (not illustrated).

The conversion circuit 302 is a circuit which converts an alternating current (AC) power source supplied from an AC power source (not illustrated) to a direct-current power source. The direct-current power source converted from the AC power source by the conversion circuit 302 is supplied to the power supply apparatus 300.

The power supply circuit 303 generates power which is output to the outside via the power supply antenna 305 and supplies the generated power to the power supply antenna 305. The power supply circuit 303 includes a matching circuit for performing impedance matching. The power supply circuit 303 has a resonance circuit for resonating the power supply antenna 305 at the same frequency as the resonance frequency of at least one of the power receiving antenna 118 and the power receiving antenna 202. The system control unit 301 controls the power supply circuit 303 to allow the power supply apparatus 300 to be resonated with any one of the electronic apparatus 100 and the external apparatus 200. The system control unit 301 controls elements such as a coil, a capacitor, and a resistor included in the power supply circuit 303 so that the power supply antenna 305 resonates at the same frequency as the resonance frequency of at least one of the electronic apparatus 100 and the external apparatus 200. The system control unit 301 controls the frequency of the power supply antenna 305 to allow controlling magnetic and electric field coupling between the power receiving antenna 118 and the power supply antenna 305. The system control unit 301 controls the frequency of the power supply antenna 305 to allow controlling magnetic and electric field coupling between the power receiving antenna 202 and the power supply antenna 305.

For this reason, the system control unit 301 controls the frequency of the power supply antenna 305 to supply power to the electronic apparatus 100 via the power receiving antenna 118 or allow inhibiting power from being supplied to the electronic apparatus 100 via the power receiving antenna 202. The system control unit 301 controls the frequency of the power supply antenna 305 to inhibit power from being supplied to the electronic apparatus 100 via the power receiving antenna 118 or allow supplying power to the electronic apparatus 100 via the power receiving antenna 202. The system control unit 301 controls the frequency of the power supply antenna 305 to supply power to the electronic apparatus 100 via the power receiving antenna 118 or allow supplying power to the electronic apparatus 100 via the power receiving antenna 202. The system control unit 301 controls the frequency of the power supply antenna 305 to inhibit power from being supplied to the electronic apparatus 100 via the power receiving antenna 118 or allow inhibiting power from being supplied to the electronic apparatus 100 via the power receiving antenna 202.

The communication circuit 304 is a circuit for communicating with at least one of the electronic apparatus 100 and the external apparatus 200 via the power supply antenna 305 and the power supply circuit 303. The communication circuit 304 transmits information and a command to at least one of the electronic apparatus 100 and the external apparatus 200. The communication circuit 304 receives information and the command from at least one of the electronic apparatus 100 and the external apparatus 200 via the power supply antenna 305 and the power supply circuit 303. The information and the command received by the communication circuit 304 are supplied to the system control unit 301. The system control unit 301 controls the power supply apparatus 300 according to the information and the command supplied from the communication circuit 304. The communication circuit 304 communicates with at least one of the electronic apparatus 100 and the external apparatus 200 according to a predetermined communication protocol. The term "predetermined communication protocol" refers to a communication protocol conforming to the ISO/IEC 18092 standard such as RFID, for example. The predetermined communication protocol may be a communication protocol of the IC tag and the tag reader such as Felica (registered trademark) or MIFARE (registered trademark). The predetermined communication protocol may be a communication protocol using communication protocol.

The power supply antenna 305 is an antenna for outputting power to the outside. The power supply antenna 305 may be a helical antenna, a loop antenna, or a plane antenna such as a meander line antenna. The system control unit 301 adjusts current flowing to the power supply antenna 305 to allow controlling magnetic and electric field coupling between the power receiving antenna 118 and the power supply antenna 305. The system control unit 301 adjusts current flowing to the power supply antenna 305 to allow controlling magnetic and electric field coupling between the power receiving antenna 202 and the power supply antenna 305.

If a distance between the electronic apparatus 100 and the power supply apparatus 300 is present within a predetermined range, the power supply apparatus 300 supplies power to the electronic apparatus 100 via the power supply antenna 305. If the distance between the electronic apparatus 100 and the power supply apparatus 300 is not present within the predetermined range, the power supply apparatus 300 cannot supply power to the electronic apparatus 100 via the power supply antenna 305.

If the distance between the electronic apparatus 100 and the power supply apparatus 300 is present within the predetermined range, the power supply apparatus 300 supplies power to the external apparatus 200 via the power supply antenna 305. If the distance between the electronic apparatus 100 and the power supply apparatus 300 is not present within the predetermined range, the power supply apparatus 300 cannot supply power to the external apparatus 200 via the power supply antenna 305.

The process performed by the electronic apparatus 100 in the first exemplary embodiment is applicable to a system in which the power supply apparatus 300 wirelessly supplies power to at least one of the electronic apparatus 100 and the external apparatus 200 by electromagnetic field coupling.

The process performed by the electronic apparatus 100 in the first exemplary embodiment is applicable to a system in which the power supply apparatus 300 wirelessly supplies power to at least one of the electronic apparatus 100 and the external apparatus 200 by electromagnetic induction.

The process performed by the electronic apparatus 100 in the first exemplary embodiment is applicable to a system in which the power supply apparatus 300 wirelessly supplies power to at least one of the electronic apparatus 100 and the external apparatus 200 by electric field coupling. In this case, the power supply apparatus 300 is provided with a power supply electrode instead of the power supply antenna 305. The electronic apparatus 100 is provided with a power receiving electrode instead of the power receiving antenna 118. The external apparatus 200 is provided with a power receiving electrode instead of the power receiving antenna 202.

In the first exemplary embodiment, the power supply apparatus 300 wirelessly supplies power to at least one of the electronic apparatus 100 and the external apparatus 200, and at least one of the electronic apparatus 100 and the external apparatus 200 wirelessly receives power from the power supply apparatus 300. The term "wireless" may be expressed in different words as "noncontact," "contactless," or "proximity."

Figure 3:
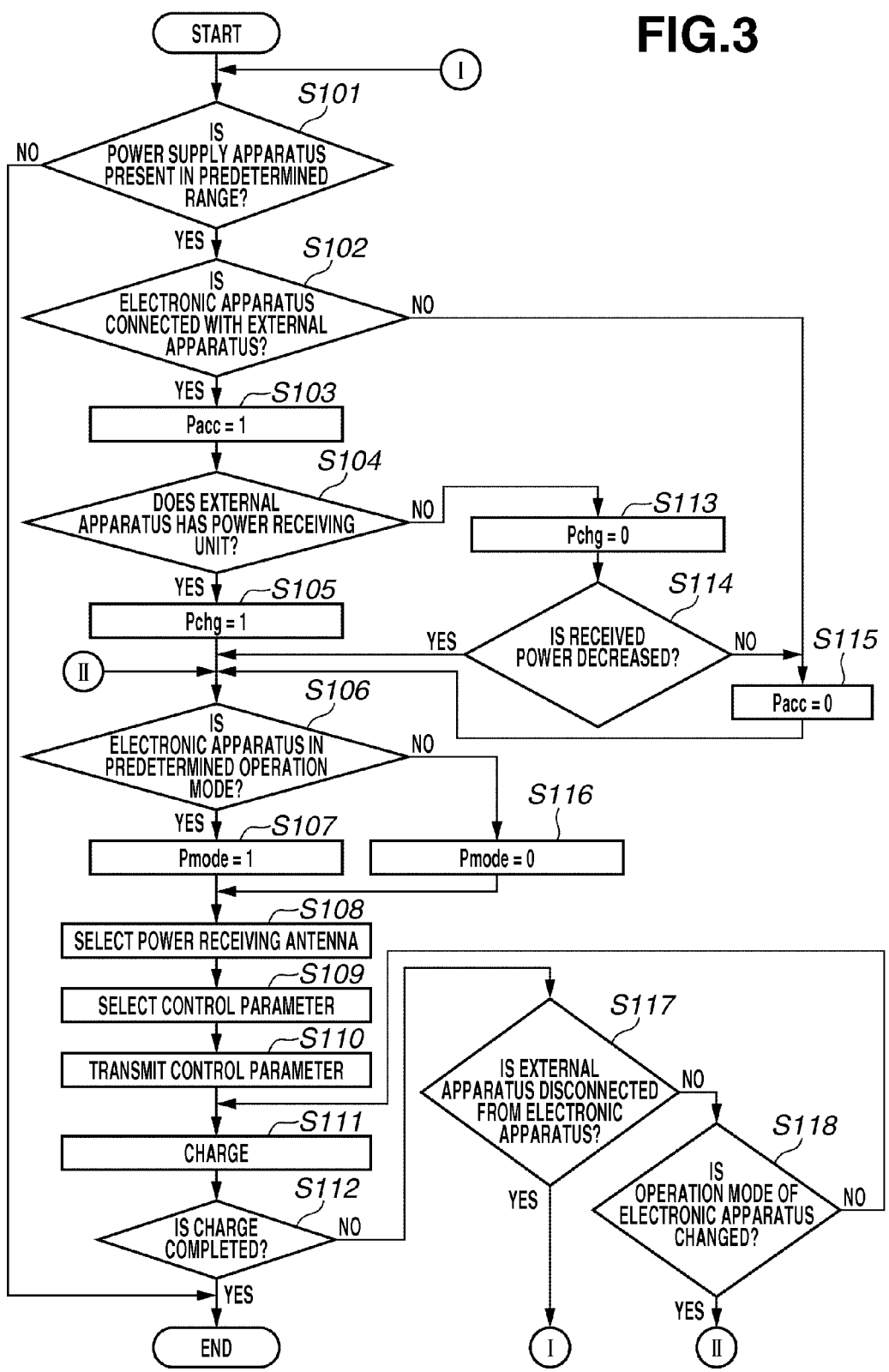
FIG. 3 is a flow chart illustrating an example of a power receiving process according to the first exemplary embodiment.

The power receiving process performed by the electronic apparatus 100 in the first exemplary embodiment is described below with reference to a flow chart in FIG. 3. The power receiving process can be realized such that the system control unit 106 executes the computer programs stored in the non-volatile memory 116. The power receiving process illustrated in FIG. 3 is a process performed by the electronic apparatus 100 if the electronic apparatus 100 can receive power. If instructions for causing the electronic apparatus 100 to receive power are input to the system control unit 106 via the operation unit 124, the system control unit 106 performs the power receiving process in FIG. 3. If it is detected that the remaining capacity of the battery 119 is not in excess of a specific remaining capacity, the system control unit 106 may perform the power receiving process in FIG. 3. If the power receiving process is performed, the system control unit 106 controls the driving circuit 122 to resonate the power receiving antenna 118 at a frequency of 200 kHz. The power supply apparatus 300 controls to resonate the power supply antenna 305 at a frequency of 200 kHz. And the power supply apparatus 300 controls so that the driving current flowing to the power supply antenna 305 becomes 1.0 A.

In step S101, the system control unit 106 determines whether the distance between the electronic apparatus 100 and the power supply apparatus 300 is present within the predetermined range. For example, the system control unit 106 determines whether the distance between the electronic apparatus 100 and the power supply apparatus 300 is present within the predetermined range depending on whether the power receiving antenna 118 receives a predetermined power from the power supply apparatus 300. In this case, if the power receiving antenna 118 receives the predetermined power from the power supply apparatus 300, the system control unit 106 determines that the distance between the electronic apparatus 100 and the power supply apparatus 300 is present within the predetermined range. In this case, if the power receiving antenna 118 does not receive the predetermined power from the power supply apparatus 300, the system control unit 106 determines that the distance between the electronic apparatus 100 and the power supply apparatus 300 is not present within the predetermined range. The system control unit 106 may determine whether the distance between the electronic apparatus 100 and the power supply apparatus 300 is present within the predetermined range depending on whether the electronic apparatus 100 is placed on the power supply apparatus 300.

If the system control unit 106 determines that the distance between the electronic apparatus 100 and the power supply apparatus 300 is present within the predetermined range (YES in step S101), the flow chart proceeds from step S101 to step S102. If the system control unit 106 determines that the distance between the electronic apparatus 100 and the power supply apparatus 300 is not present within the predetermined range (NO in step S101), the flow chart ends.

In step S102, the system control unit 106 determines whether an apparatus is connected to at least one of the connection units 101, 102, 103, 104, and 105. If the system control unit 106 determines that the apparatus is connected to at least one of the connection units 101, 102, 103, 104, and 105 (YES in step S102), the flow chart proceeds from step S102 to step S103. If the system control unit 106 determines that the apparatus is not connected to the connection units 101, 102, 103, 104, and 105 (NO in step S102), the flow chart proceeds from step S102 to step S115.

In step S103, the system control unit 106 sets the value of a variable Pacc recorded in a memory in the system control unit 106 to "1." The term "variable Pacc" is a value indicating whether the apparatus is connected to the electronic apparatus 100. If the variable Pacc is set to "1," the system control unit 106 determines that the apparatus is connected to the electronic apparatus 100. If the variable Pacc is set to "0," the system control unit 106 determines that the apparatus is not connected to the electronic apparatus 100. If the variable Pacc is set to "1," the flow chart proceeds from step S103 to step S104.

In step S104, the system control unit 106 determines whether the apparatus connected to the electronic apparatus 100 has a unit for receiving power from the power supply apparatus 300. The apparatus connected to the electronic apparatus 100 is the apparatus determined as an apparatus connected to the electronic apparatus 100 in step S102.

The unit for receiving power from the power supply apparatus 300 refers to a power receiving antenna, for example, for receiving power from the power supply apparatus 300. In this case, the system control unit 106 determines whether the apparatus connected to the electronic apparatus 100 has a power receiving antenna by inquiring the apparatus connected to the electronic apparatus 100. The system control unit 106 may determine whether the apparatus connected to the electronic apparatus 100 has the power receiving antenna depending on whether the apparatus connected to the electronic apparatus 100 is the external apparatus 200 illustrated in FIG. 2.

If the system control unit 106 determines that the apparatus connected to the electronic apparatus 100 has the unit for receiving power from the power supply apparatus 300 (YES in step S104), the flow chart proceeds from step S104 to step S105. If the system control unit 106 determines that the apparatus connected to the electronic apparatus 100 does not have the unit for receiving power from the power supply apparatus 300 (NO in step S104), the flow chart proceeds from step S104 to step S113.

In step S105, the system control unit 106 sets the value of a variable Pchg recorded in a memory in the system control unit 106 to "1." The term "variable Pchg" is a value indicating whether the apparatus connected to the electronic apparatus 100 can receive power from the power supply apparatus 300. If the variable Pchg is set to "1," the system control unit 106 detects that the apparatus connected to the electronic apparatus 100 can receive power from the power supply apparatus 300. If the variable Pchg is set to "0," the system control unit 106 detects that the apparatus connected to the electronic apparatus 100 cannot receive power from the power supply apparatus 300. If the variable Pchg is set to "1," the flow chart proceeds from step S105 to step S106.

In step S106, the system control unit 106 determines whether the electronic apparatus 100 is in a predetermined operation mode. The term "predetermined operation mode" refers to at least one of, for example, a still image shooting mode in which a still image is captured using the imaging circuit 107, a moving image recording mode in which a moving image is recorded using the imaging circuit 107, and a direction detection mode in which a direction regarding the electronic apparatus 100 is detected using the geomagnetic sensor 117.

The predetermined mode may be the one that is set by the system control unit 106 or that can be set by the user operating the operation unit 124. The predetermined mode may be the one that is set to reduce the influence of power supplied from the power supply apparatus 300 on the operation and circuits of the electronic apparatus 100 when the power receiving antenna 118 receives power from the power supply apparatus 300. For this reason, the predetermined mode may be a mode excluding the still image shooting mode and the direction detection mode. The predetermined mode may be at least one of a live view shooting mode, a distance measurement mode using the distance measurement circuit 109, a light metering mode using the light metering circuit 110, and a flash light control mode using the flash light control circuit 111. The predetermined mode may be at least one of an audio input mode using the audio circuit 112, an audio output mode using the audio circuit 112, and a video mode in which a moving image is recorded using the video circuit 113. The predetermined mode may be a mode for performing communication based on a wireless LAN standard if a wireless LAN unit (not illustrated) is connected with the connection unit 104.

If the system control unit 106 determines that the electronic apparatus 100 is in the predetermined operation mode (YES in step S106), the flow chart proceeds from step S106 to step S107. If the system control unit 106 determines that the electronic apparatus 100 is not in the predetermined operation mode (NO in step S106), the flow chart proceeds from step S106 to step S116.

In step S107, the system control unit 106 sets a value of a variable Pmode recorded in a memory in the system control unit 106 to "1." The term "variable Pmode" is a value indicating whether the electronic apparatus 100 is in the predetermined operation mode. If the variable Pmode is set to "1," the system control unit 106 determines that the electronic apparatus 100 is in the predetermined operation mode. If the variable Pmode is set to "0," the system control unit 106 determines that the electronic apparatus 100 is not in the predetermined operation mode. If the variable Pmode is set to "1," the flow chart proceeds from step S107 to step S108.

In step S108, the system control unit 106 selects a power receiving antenna used for receiving power wirelessly supplied from the power supply apparatus 300. The system control unit 106 selects a power receiving antenna based on the variables Pacc and Pchg recorded in the memory in the system control nit 106 with reference to a selection table in FIG. 4 recorded in the non-volatile memory 116. The selection table in FIG. 4 is a table which the variables Pacc and Pchg and power receiving antennas to be selected are associated with one another.

For example, if the variables Pacc and Pchg are set to "0," the system control unit 106 selects the power receiving antenna 118 to receive power supplied from the power supply apparatus 300. At this point, the system control unit 106 does not select the power receiving antenna 202. In this case, the system control unit 106 turns on the switching circuit 123 to supply the power via the power receiving antenna 118 to the power source control circuit 120. Furthermore, the system control unit 106 may turn off the switching circuit 206 to preclude the power via the power receiving antenna 202 from being supplied to the power source control circuit 120.

If the variable Pacc is set to "0" and the variable Pchg are set to "1," the system control unit 106 selects the power receiving antenna 118 to receive power supplied from the power supply apparatus 300. At this point, the system control unit 106 does not select the power receiving antenna 202. In this case, the system control unit 106 turns on the switching circuit 123 to supply the power via the power receiving antenna 118 to the power source control circuit 120. Furthermore, the system control unit 106 may turn off the switching circuit 206 to preclude the power via the power receiving antenna 202 from being supplied to the power source control circuit 120.

If the variable Pacc is set to "1" and the variable Pchg are set to "0," the system control unit 106 selects the power receiving antenna 118 to receive power supplied from the power supply apparatus 300. At this point, the system control unit 106 does not select the power receiving antenna 202. In this case, the system control unit 106 turns on the switching circuit 123 to supply the power via the power receiving antenna 118 to the power source control circuit 120. Furthermore, the system control unit 106 turns off the switching circuit 206 to preclude the power via the power receiving antenna 202 from being supplied to the power source control circuit 120.

If the variable Pacc is set to "1" and the variable Pchg are set to "1," the system control unit 106 selects the power receiving antenna 202 to receive power supplied from the power supply apparatus 300. At this point, the system control unit 106 does not select the power receiving antenna 118. In this case, the system control unit 106 turns on the switching circuit 206 to supply the power via the power receiving antenna 202 to the power source control circuit 120. Furthermore, the system control unit 106 turns off the switching circuit 123 to preclude the power via the power receiving antenna 118 from being supplied to the power source control circuit 120.

If at least one of the power receiving antennas 118 and 202 is selected by the system control unit 106, the flow chart proceeds from step S108 to step S109.

In step S109, the system control unit 106 selects a control parameter for controlling the power supply apparatus 300. The control parameter is a parameter for controlling the drive of the power supply antenna 305, for example, and includes information indicating the driving current of the power supply antenna 305 and the driving frequency of the power supply antenna 305.

For example, the system control unit 106 selects a control parameter based on the variable Pmode recorded in the memory in the system control unit 106 with reference to a first parameter selection table in FIG. 5 in the non-volatile memory 116. The first parameter selection table in FIG. 5 is a table which associates the variables Pmode with control parameters.

If the variables Pmode is set to "0", the system control unit 106 selects a first control parameter so that the supply of power from the power supply apparatus 300 to the electronic apparatus 100 is prioritized than the influence of power from the power supply apparatus 300 to circuits and operation of the electronic apparatus 100. In this case, the system control unit 106 selects the first control parameter in which a driving current is 1.0 A and a driving frequency is 200 kHz. The first control parameter is a parameter for controlling the power supply apparatus 300 to maximize the power received from the power supply apparatus 300 by a power receiving antennas selected in step S108. If the first control parameter is selected, the system control unit 106 controls to resonate the power receiving antenna selected in step S108 at a frequency of 200 kHz.

If the variables Pmode is set to "1," the system control unit 106 selects a second control parameter for stopping the supply of power by the power supply apparatus 300. The second control parameter is a parameter for controlling the power supply apparatus 300 to stop the supply of power thereof. This is done not to exert an influence on the operation performed by the circuits of the electronic apparatus 100 and the electronic apparatus 100 due to the supply of power from the power supply apparatus 300 to the electronic apparatus 100. For this reason, if the electronic apparatus 100 is in the predetermined operation mode, the electronic apparatus 100 can inhibit the operation thereof due to the supply of power from the power supply apparatus 300. If the second control parameter is selected, the system control unit 106 may control not to receive power via the power receiving antenna selected in step S108.

If the power supply apparatus 300 acquires the second control parameter, the power supply apparatus 300 stops supplying power to the electronic apparatus 100. The second control parameter may be the one that changes the driving frequency of the power supply antenna 305 to a frequency which does not inhibit the operation of the electronic apparatus 100 to decrease the intensity of the electromagnetic field generated by the power supply antenna 305.

For example, the system control unit 106 may select a control parameter based on the variables Pchg and Pmode recorded in the memory in the system control unit 106 with reference to the second parameter selection table in FIG. 6 in the non-volatile memory 116. The second parameter selection table in FIG. 6 is a table in which the variables Pchg and Pmode and control parameters are associated with one another.

If the variable Pchg is set to "0" and the variable Pmode is set to "0," the third control parameter is selected so that the supply of power from the power supply apparatus 300 to the electronic apparatus 100 is prioritized. In this case, the supply of power from the power supply apparatus 300 to the electronic apparatus 100 is prioritized than the influence of power from the power supply apparatus 300 to circuits and operation of the electronic apparatus 100. For this reason, the system control unit 106 selects the third control parameter in which driving current is 1.5 A and a driving frequency is 200 kHz. The third control parameter is a parameter which serves to prevent the power received from the power supply apparatus 300 by the power receiving antenna 118 from becoming smaller, in a case where an apparatus is connected to the electronic apparatus 100, than the power in a case where the apparatus is not connected to the electronic apparatus 100. Since the driving current in the third control parameter is larger than the driving current in the first control parameter, magnetic field coupling between the power supply apparatus 300 and the electronic apparatus 100 can be strengthened. If the third control parameter is selected, the system control unit 106 controls to resonate the power receiving antenna selected in step S108 at a frequency of 200 kHz.

A distance between the electronic apparatus 100 and the power supply apparatus 300 in a case where the apparatus is connected with the electronic apparatus 100 may be greater than the distance between the electronic apparatus 100 and the power supply apparatus 300 in a case where the apparatus is not connected to the electronic apparatus 100. The greater the distance between the electronic apparatus 100 and the power supply apparatus 300, the smaller the power received from the external apparatus 200 by the power receiving antenna 118, which lowers the power supplied from the power supply apparatus 300 to the electronic apparatus 100 via the power receiving antenna 118. For this reason, the system control unit 106 uses the third control parameter to increase the intensity of the electromagnetic field generated by the power supply antenna 305. Thereby, the power received by the power receiving antenna 118 in a case where the apparatus is connected to the electronic apparatus 100 is inhibited from becoming smaller than the power received by the power receiving antenna 118 in a case where the apparatus is not connected to the electronic apparatus 100. Consequently, the system control unit 106 inhibits the power received by the power receiving antenna 118 from being decreased even in a case where the apparatus is connected to the electronic apparatus 100. For that reason, even in a case where the apparatus is connected to the electronic apparatus 100 (YES in step S102), the electronic apparatus 100 can supply the power required for the operation of the electronic apparatus 100 and supplied from the power supply apparatus 300 to circuits in the electronic apparatus 100. Furthermore, even in a case where the apparatus is connected to the electronic apparatus 100 (YES in step S102), the electronic apparatus 100 can charge the battery 119 by using the power supplied from the power supply apparatus 300.

If the variable Pchg is set to "0" and the variable Pmode is set to "1," the system control unit 106 selects a fourth control parameter for inhibiting the supply of power by the power supply apparatus 300 from affecting the circuits and operation of the electronic apparatus 100. In this case, the system control unit 106 selects the fourth control parameter in which a driving current is 1.5 A and a driving frequency is 300 kHz. The fourth control parameter is a parameter which serves to prevent the operation of the electronic apparatus 100 from the influence of power from the power supply apparatus 300.

If the predetermined mode is in at least one of the still image shooting mode and the moving image recording mode, for example, an electromagnetic field at 250 kHz or lower affects the operation of the imaging circuit 107. For this reason, the power supply apparatus 300 is controlled by the fourth control parameter so that the resonance frequency of the power supply apparatus 300 becomes 300 kHz higher than 250 kHz. If the fourth control parameter is selected, the system control unit 106 controls to resonate the power receiving antenna selected in step S108 at a frequency of 300 kHz. Since the fourth control parameter is higher in a driving frequency than the third control parameter, even if a distance between the power supply antenna 305 and the power receiving antenna selected in step S108 is long, the electronic apparatus 100 can receive power from the power supply apparatus 300 by using the power receiving antenna selected in step S108.

If the electronic apparatus 100 is in the predetermined mode, the driving frequency of the power supply antenna 305 and the electromagnetic field generated by the power supply antenna 305 can affect the circuits and units of the electronic apparatus 100 when the power supply antenna 305 is driven at a predetermined frequency. In this case, the circuits and units of the electronic apparatus 100 is sometimes not normally operated or the operation performed by the electronic apparatus 100 can be inhibited. For this reason, the system control unit 106 uses the fourth control parameter to change the driving frequency of the power supply antenna 305 to a frequency which does not inhibit the operation of the electronic apparatus 100, preventing increasing the intensity of the electromagnetic field generated by the power supply antenna 305. Thereby, the electronic apparatus 100 can prevent the operation performed by the electronic apparatus 100 from influence of power from the power supply apparatus 300. The driving frequency included in the fourth control parameter is 300 kHz. However, the driving frequency may be any frequencies other than 300 kHz, provided that the driving frequency is different from a frequency which may affect the operation of the electronic apparatus 100.

If the variable Pchg is set to "1" and the variable Pmode is set to "0," the system control unit 106 selects a fifth control parameter for prioritizing the supply of power from the power supply apparatus 300 to the electronic apparatus 100. In this case, the system control unit 106 prioritizes the supply of power from the power supply apparatus 300 to the electronic apparatus 100. In this case, the system control unit 106 selects the fifth control parameter in which a driving current is 1.0 A and a driving frequency is 400 kHz. The fifth control parameter is a parameter which maximizes the power received from the power supply apparatus 300 by the power receiving antenna selected in step S108. If the variable Pchg is set to "1" and the variable Pmode is set to "0," the electronic apparatus 100 receives the power from the power supply apparatus 300 by using the power receiving antenna 202. If the electronic apparatus 100 receives the power from the power supply apparatus 300 by using the power receiving antenna 202, the circuits and the units in the electronic apparatus 100 are less susceptible to the influence of power from the power supply apparatus 300. For this reason, if the electronic apparatus 100 is supplied with power from the power supply apparatus 300 via the power receiving antenna 202, the operation of the electronic apparatus 100 is not inhibited by the supply of power from the power supply apparatus 300.

If the variable Pchg is set to "1" and the variable Pmode is set to "1," the system control unit 106 selects the fifth control parameter as is the case where the variable Pchg is set to "1" and the variable Pmode is set to "0." If the variable Pchg is set to "1" and the variable Pmode is set to "1," the electronic apparatus 100 receives power from the power supply apparatus 300 by using the power receiving antenna 202. For this reason, even in a case where the electronic apparatus 100 is supplied with power from the power supply apparatus 300 via the power receiving antenna 202, the circuits and the units in the electronic apparatus 100 are less susceptible to the influence of power from the power supply apparatus 300. Thereby, if the electronic apparatus 100 is supplied with power from the power supply apparatus 300 via the power receiving antenna 202 and even if the electronic apparatus 100 is in the predetermined mode, the operation of the electronic apparatus 100 is not inhibited by the supply of power from the power supply apparatus 300. If the fifth control parameter is selected, the system control unit 106 controls to resonate the power receiving antenna 202 at a frequency of 400 kHz. Since the fifth control parameter is higher in a driving frequency than the first control parameter, even if a distance between the power supply antenna 305 and the power receiving antenna selected in step S108 is long, the electronic apparatus 100 can receive power from the power supply apparatus 300.

In step S109, if the control parameter selected by the system control unit 106 is recorded in the memory in the system control unit 106, the flow chart proceeds from step S109 to step S110.

In step S110, the system control unit 106 controls the communication circuit 121 to transmit the control parameter selected in step S109 to the power supply apparatus 300. If the communication circuit 121 transmits the control parameter to the power supply apparatus 300, the flow chart proceeds from step S110 to step S111.

If the power supply apparatus 300 receives the control parameter transmitted from the electronic apparatus 100, the power supply apparatus 300 controls power which is output from the power supply antenna 305 based on the control parameter. For example, if the power supply apparatus 300 receives the second control parameter, the power supply apparatus 300 stops power. For example, if the power supply apparatus 300 receives the first control parameter, the power supply apparatus 300 controls the intensity of the electromagnetic field generated by the power supply antenna 305 based on the first control parameter. Furthermore, the power supply apparatus 300 controls the resonance frequency of the power supply antenna 305 based on the first control parameter. In this case, the system control unit 301 controls so that current flowing to the power supply antenna 305 becomes a driving current of 1.0 A and controls so that the resonance frequency of the power supply antenna 305 becomes a driving frequency of 200 kHz. For other example, if the power supply apparatus 300 receives the third control parameter, the power supply apparatus 300 controls the intensity of the electromagnetic field generated by the power supply antenna 305 based on the third control parameter. Furthermore, the power supply apparatus 300 controls the resonance frequency of the power supply antenna 305 based on the third control parameter. In this case, the system control unit 301 controls so that current flowing to the power supply antenna 305 becomes a driving current of 1.5 A and controls so that the resonance frequency of the power supply antenna 305 becomes a driving frequency of 200 kHz. For other example, if the power supply apparatus 300 receives the fourth control parameter, the power supply apparatus 300 controls the intensity of the electromagnetic field generated by the power supply antenna 305 based on the fourth control parameter. Furthermore, the power supply apparatus 300 controls the resonance frequency of the power supply antenna 305 based on the fourth control parameter. In this case, the system control unit 301 controls so that current flowing to the power supply antenna 305 becomes a driving current of 1.5 A and controls so that the resonance frequency of the power supply antenna 305 becomes a driving frequency of 300 kHz. For other example, if the power supply apparatus 300 receives the fifth control parameter, the power supply apparatus 300 controls the intensity of the electromagnetic field generated by the power supply antenna 305 based on the fifth control parameter. Furthermore, the power supply apparatus 300 controls the resonance frequency of the power supply antenna 305 based on the fifth control parameter. In this case, the system control unit 301 controls so that current flowing to the power supply antenna 305 becomes a driving current of 1.0 A and controls so that the resonance frequency of the power supply antenna 305 becomes a driving frequency of 400 kHz.

In step S111, the system control unit 106 controls the power source control circuit 120 to perform charging by using the power received via the power receiving antenna selected in step S108.

For example, if the electronic apparatus 100 is connected to the external apparatus 200, the power source control circuit 120 charges at least one of the batteries 119 and 203 and detects the remaining capacity of the batteries 119 and 203. In this case, the power source control circuit 120 may charge the battery 119 in preference to the battery 203. Also, the power source control circuit 120 may charge the batteries 119 and 203 in parallel. The power source control circuit 120 may preferentially charge the batteries 119 or 203, whichever is smaller in the remaining capacity, or may preferentially charge the batteries 119 or 203, whichever is greater in the remaining capacity.

For example, if the electronic apparatus 100 is not connected to the external apparatus 200, the power source control circuit 120 charges the battery 119 and detects the remaining capacity of the battery 119.

If the electronic apparatus 100 is in other modes excluding the power-source off mode, the system control unit 106 controls the power source control circuit 120 to supply the electronic apparatus 100 with the power received via the power receiving antenna selected in step S108.

For example, if the electronic apparatus 100 is in a reproduction mode, the system control unit 106 controls the power source control circuit 120 to supply the recording unit 114, the recording medium 114a and the display unit 115 with the power received via the power receiving antenna selected in step S108.

If the electronic apparatus 100 is in a shooting mode, the system control unit 106 controls the power source control circuit 120 to supply the imaging circuit 107 and the AD conversion circuit 108 with the power received via the power receiving antenna selected in step S108. In this case, the system control unit 106 controls the power source control circuit 120 to supply the distance measurement circuit 109, the light metering circuit 110, and the flashlight control circuit 111 with the power received via the power receiving antenna selected in step S108. Furthermore, in this case, the system control unit 106 controls the power source control circuit 120 to supply the audio circuit 112, the video circuit 113, the recording unit 114, and the recording medium 114a with the power received via the power receiving antenna selected in step S108.

If the electronic apparatus 100 is in a direction detection mode, the system control unit 106 controls the power source control circuit 120 to supply the geomagnetic sensor 117 with the power received via the power receiving antenna selected in step S108.

If the power source control circuit 120 starts charging, the flow chart proceeds from step S111 to step S112.

In step S112, the power source control circuit 120 detects whether the power source control circuit 120 completes charging.

For example, if the power source control circuit 120 is charging the batteries 110 and 203, the system control unit 106 detects whether the batteries 119 and 203 are fully charged. In this case, if the system control unit 106 detects that the batteries 119 and 203 are fully charged, the system control unit 106 detects that the power source control circuit 120 completes charging. If the system control unit 106 detects that at least one of the batteries 119 and 203 is not fully charged, the system control unit 106 detects that the power source control circuit 120 does not complete charging.

For example, if the electronic apparatus 100 is not connected to the external apparatus 200 and the power source control circuit 120 is charging the battery 119, the system control unit 106 detects whether the battery 119 is fully charged. In this case, if the system control unit 106 detects that the battery 119 is fully charged, the system control unit 106 detects that the power source control circuit 120 completes charging. If the system control unit 106 detects that the battery 119 is not fully charged, the system control unit 106 detects that the power source control circuit 120 does not yet complete charging.

If the power source control circuit 120 detects that the power source control circuit 120 completes charging (YES in step S112), the system control unit 106 controls the power source control circuit 120 to stop charging and the flow chart ends.

If the power source control circuit 120 detects that the power source control circuit 120 does not yet complete charging (NO in step S112), the flow chart proceeds from step S112 to step S117.

In step S113, the system control unit 106 sets the value of the variable Pchg recorded in the memory in the system control unit 106 to "0." If the variable Pchg is set to "0," the flow chart proceeds from step S113 to step S114.

In step S114, the system control unit 106 detects whether a received power is decreased than a power exceeding the predetermined value. The received power is a power that is received from the power supply apparatus 300 via the power receiving antenna 118 when the apparatus is connected to the electronic apparatus. In this case, the system control unit 106 reads device information regarding the apparatus connected to the electronic apparatus 100 from the non-volatile memory 116. Furthermore, the system control unit 106 detects whether the apparatus connected with the electronic apparatus 100 affects the power received via the power receiving antenna 118, using the read device information.

For example, information indicating information about the shape of the apparatus and the function thereof is recorded in the device information regarding the apparatus connected to the electronic apparatus 100. Alternatively, the device information regarding the apparatus connected to the electronic apparatus 100 may include information indicating whether power is preferentially received from the power supply apparatus 300 using the power receiving antenna 118 if the apparatus is connected to the electronic apparatus 100.

If the system control unit 106 detects that the received power is decreased than the power exceeding the predetermined value (YES in step S114), the flow chart proceeds from step S114 to step S106.

If the system control unit 106 detects that the received power is not decreased than the power exceeding the predetermined value (NO in step S114), the flow chart proceeds from step S114 to step S115.

In step S115, the system control unit 106 sets the value of the variable Pacc recorded in the memory in the system control unit 106 to "0." If the variable Pacc is set to "0," the flow chart proceeds from step S115 to step S106.

In step S116, the system control unit 106 sets the value of the variable Pmode recorded in the memory in the system control unit 106 to "0." If the variable Pmode is set to "0," the flow chart proceeds from step S116 to step S108.

In step S117, the system control unit 106 detects whether the apparatus connected to at least one of the connection units 101, 102, 103, 104, and 105 is removed from the electronic apparatus 100. If the apparatus is removed from the electronic apparatus 100 (YES in step S117), the flow chart returns from step S117 to step S101. If the apparatus is not removed from the electronic apparatus 100 (NO in step S117), the flow chart returns from step S117 to step S118.

In step S118, the system control unit 106 detects whether the operation mode of the electronic apparatus 100 is changed. If the system control unit 106 detects that the operation mode of the electronic apparatus 100 is not changed (NO in step S118), the flowchart returns from step S118 to step S111. In this case, the system control unit 106 controls the power source control circuit 120 to perform charging continuously. If the system control unit 106 detects that the operation mode of the electronic apparatus 100 is changed (YES in step S118), the flow chart returns from step S118 to step S106. In this case, the system control unit 106 selects again any one of the power receiving antennas 202 and 118 according to the changed operation mode of the electronic apparatus 100. Furthermore, the system control unit 106 selects a control parameter to be transmitted to the power supply apparatus 300.

The electronic apparatus 100 according to the first exemplary embodiment selects the control parameter according to the operation mode of the electronic apparatus 100.

If the operation mode of the electronic apparatus 100 is in the predetermined mode (YES in step S106), the electronic apparatus 100 can be supplied with power from the power supply apparatus 300 without inhibiting the operation performed by the electronic apparatus 100.

In this case, the electronic apparatus 100 can control power supplied from the power supply apparatus 300 using any one of the second and fourth control parameters. If the electronic apparatus 100 controls the power supply apparatus 300 using the second control parameter, the electronic apparatus 100 can control the power supply apparatus 300 to stop supply power so as to perform normally the operation by the electronic apparatus 100. If the electronic apparatus 100 controls the power supply apparatus 300 using the fourth control parameter, the electronic apparatus 100 can cause the power supply apparatus 300 to supply power without inhibiting the operation performed by the electronic apparatus 100.

If the operation mode of the electronic apparatus 100 is not in the predetermined mode (NO in step S106), the electronic apparatus 100 can control the power supply apparatus 300 using any one of the first and third control parameters. If the electronic apparatus 100 controls the power supply apparatus 300 using the first control parameter, the electronic apparatus 100 can control the power supplied from the power supply apparatus 300 so that the electronic apparatus 100 is supplied with power for performing a specific operation and charging.

The electronic apparatus 100 according to the first exemplary embodiment selects the control parameter depending on whether the apparatus connected to the electronic apparatus 100 includes a unit for receiving power supplied from the power supply apparatus 300.

If the apparatus connected to the electronic apparatus 100 includes the unit for receiving power from the power supply apparatus 300 (YES in step S104), the electronic apparatus 100 selects a power receiving antenna of the apparatus connected to the electronic apparatus 100. In this case, the electronic apparatus 100 can control power supplied from the power supply apparatus 300 using the fifth control parameter. If the electronic apparatus 100 controls the power supply apparatus 300 using the fifth control parameter, the electronic apparatus 100 can cause the power supply apparatus 300 to supply power without inhibiting the operation performed by the electronic apparatus 100. In this case, even if the electronic apparatus 100 is in the predetermined mode, the electronic apparatus 100 controls power supplied from the power supply apparatus 300 to supply the power required for the electronic apparatus 100 without inhibiting the operation performed by the electronic apparatus 100.

If the apparatus connected to the electronic apparatus 100 does not include the unit for receiving power from the power supply apparatus 300 (NO in step S104), the electronic apparatus 100 selects the power receiving antenna 118. In this case, the electronic apparatus 100 can control power supplied from the power supply apparatus 300 using anyone of the first, second, third, and fourth control parameters based on the operation mode of the electronic apparatus 100.

Therefore, the electronic apparatus 100 according to the first exemplary embodiment can control power supplied from the power supply apparatus 300 to the electronic apparatus 100 based on the operation mode of the electronic apparatus 100 and the apparatus connected to the electronic apparatus 100.

If the electronic apparatus 100 has a talking unit using telephone, the predetermined mode may be a communication mode using a communication line. If the electronic apparatus 100 has a communication unit other than the communication circuit 121, the predetermined mode may be a communication mode using a communication unit other than the communication circuit 121.

If the operation unit 124 has a touch panel (touch screen), the predetermined mode may be an operation mode for operating the electronic apparatus 100 using the touch panel of the operation unit 124. In this case, the touch panel of the operation unit 124 may be the one that uses an electrostatic capacity method or an electromagnetic induction method. In this case, the touch panel of the operation unit 124 may be the one that uses a method other than the electrostatic capacity method and the electromagnetic induction method.

Figure 2:
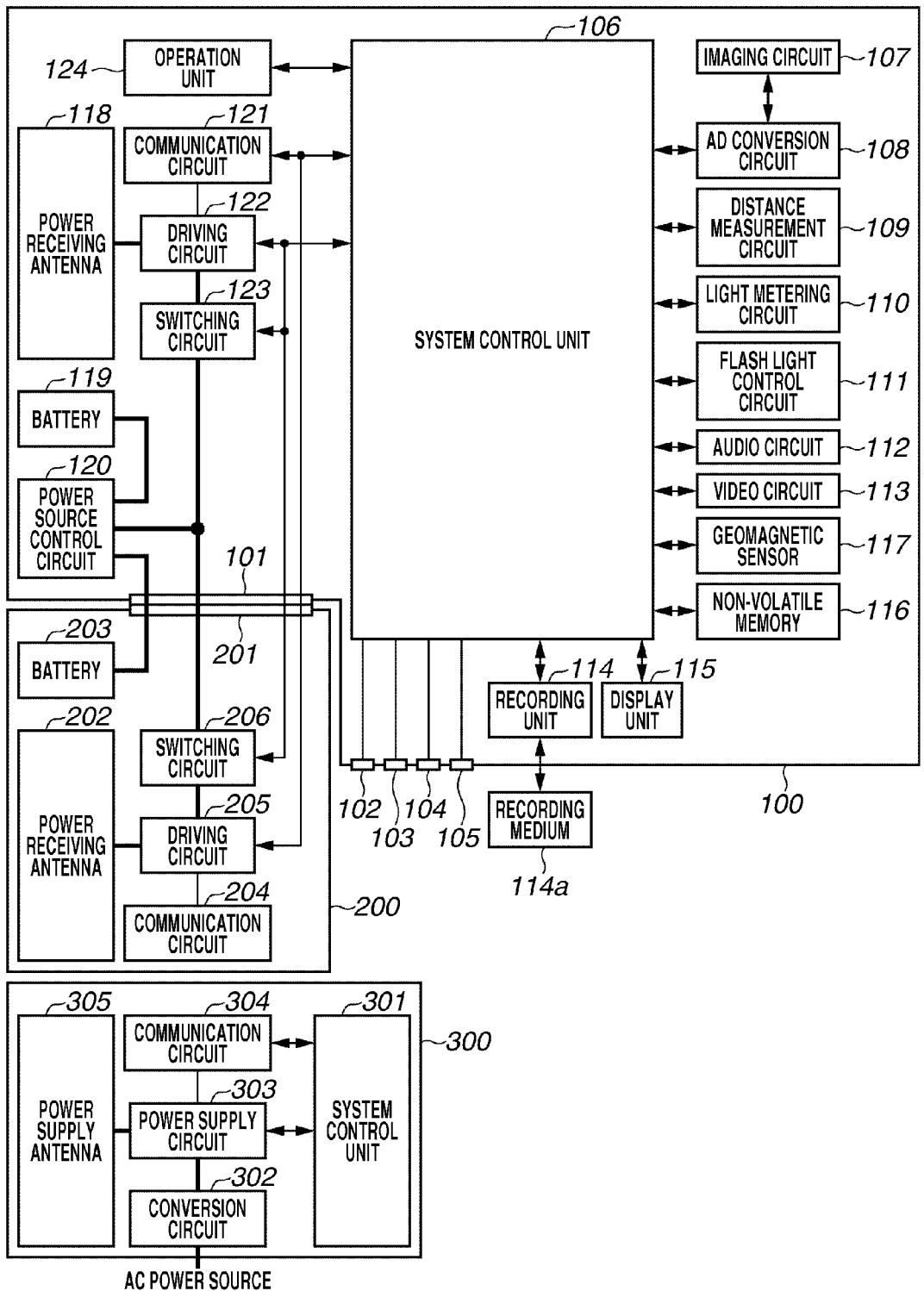
FIG. 2 illustrates an example of a block diagram of the power supply system according to the first exemplary embodiment.
Figure 7:
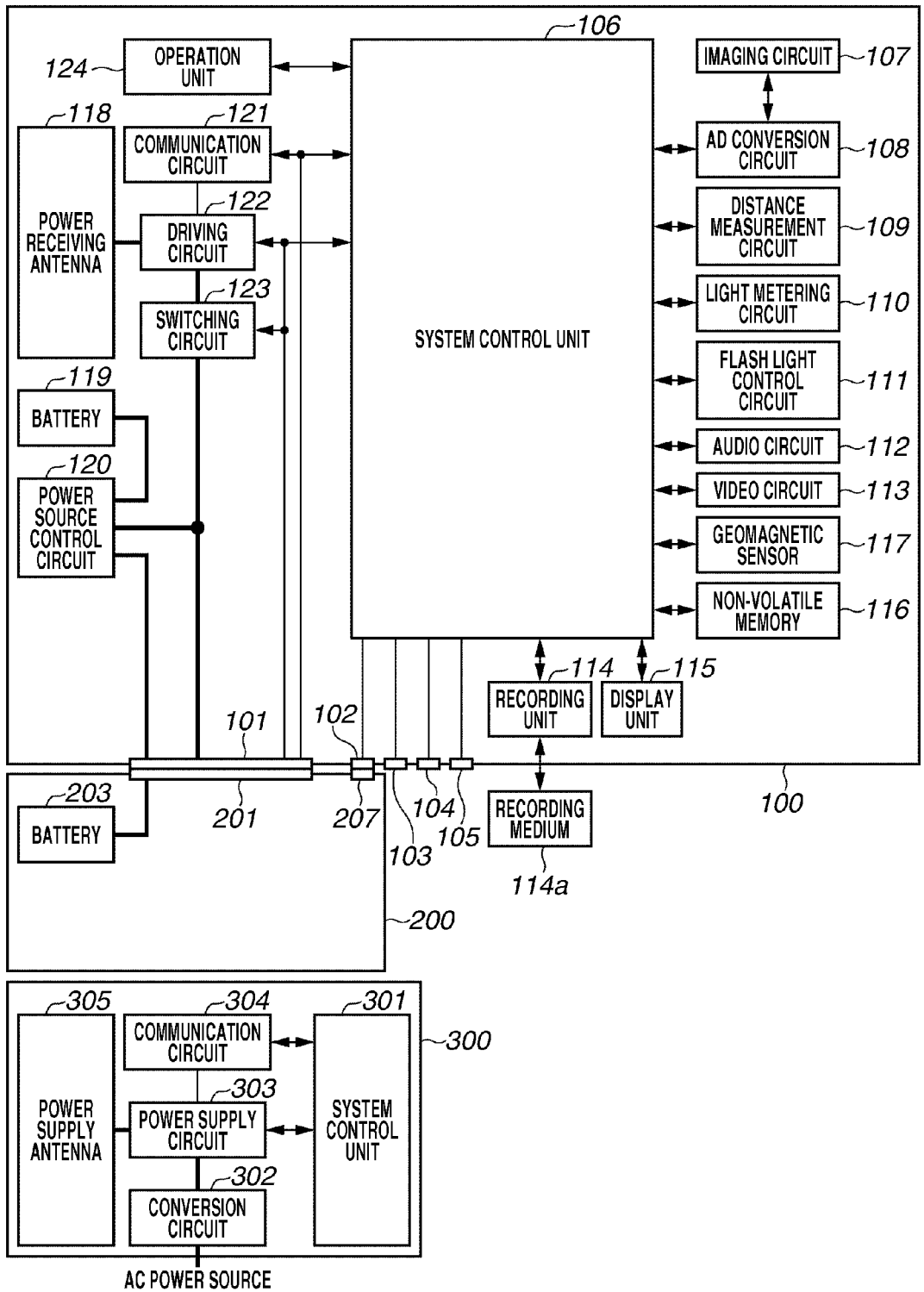
FIG. 7 illustrates an example of a block diagram of the power supply system according to the first exemplary embodiment.

The above description is made on the assumption that the external apparatus 200 in the charging system according to the first exemplary embodiment has the configuration illustrated in FIG. 2. However, the external apparatus 200 in the charging system according to the first exemplary embodiment may have a configuration illustrated in FIG. 7. Even if the external apparatus 200 having the configuration illustrated in FIG. 7 is connected to the electronic apparatus 100, the power receiving process conducted by the system control unit 106 illustrated in FIG. 3 is preformed. The external apparatus 200 illustrated in FIG. 7 does not include a unit for receiving power supplied from the power supply apparatus. If the external apparatus 200 is connected to the electronic apparatus 100 and the system control unit 106 performs the power receiving process illustrated in FIG. 3, the power receiving antenna 118 is selected for receiving the power supplied from the power supply apparatus 300. If the external apparatus 200 is connected to the electronic apparatus 100 and the system control unit 106 performs the power receiving process illustrated in FIG. 3, the system control unit 106 does not transmit the fifth control parameter to the power supply apparatus 300.

If the electronic apparatus 100 according to the first exemplary embodiment is set to the first mode to protect the operation and circuits of the electronic apparatus 100, the electronic apparatus 100 may perform the process for selecting the control parameter using the first parameter selection table illustrated in FIG. 5 in step S109. If the electronic apparatus 100 is in the first mode, the electronic apparatus 100 does not perform the process for selecting the control parameter using the second parameter selection table illustrated in FIG. 6. If the electronic apparatus 100 is set to the second mode for prioritizing the supply of power from the power supply apparatus 300 to the electronic apparatus 100, the electronic apparatus 100 may perform the process for selecting the control parameter using the second parameter selection table illustrated in FIG. 6 instep S109. If the electronic apparatus 100 is in the second mode, the electronic apparatus 100 does not perform the process for selecting the control parameter using the first parameter selection table illustrated in FIG. 5.

In this case, the electronic apparatus 100 according to the first exemplary embodiment may set to the first or second mode according to the remaining capacity of any one of the batteries 119 and 203. For this reason, if the system control unit 106 detects that the sum of the remaining capacities of the batteries 119 and 203 does not exceed a predetermined remaining capacity, the system control unit 106 sets the electronic apparatus 100 to the second mode. In this case, the system control unit 106 performs the process for selecting the control parameter using the second parameter selection table illustrated in FIG. 6 in step S109. If the system control unit 106 detects that the sum of the remaining capacities of the batteries 119 and 203 exceeds the predetermined remaining capacity, the system control unit 106 sets the electronic apparatus 100 to the first mode. In this case, the system control unit 106 performs the process for selecting the control parameter using the first parameter selection table illustrated in FIG. 5 in step S109.

If the external apparatus 200 is not connected to the electronic apparatus 100 and the electronic apparatus 100 detects that the remaining capacity of the battery 119 exceeds the predetermined remaining capacity, the electronic apparatus 100 is set to the first mode. If the external apparatus 200 is not connected to the electronic apparatus 100 and the electronic apparatus 100 detects that the remaining capacity of the battery 119 does not exceed the predetermined remaining capacity, the electronic apparatus 100 is set to the second mode.

In step S111, the system control unit 106 controls the power source control circuit 120 to perform charging using the power received from the power supply apparatus 300. In step S111, the system control unit 106 may perform operation according to the operation mode of the electronic apparatus 100 without charging using the power received from the power supply apparatus 300. In this case, in step S112, the system control unit 106 detects whether the electronic apparatus 100 completes operation. If the electronic apparatus 100 completes operation, the power receiving process in FIG. 3 ends. If the electronic apparatus 100 does not complete operation, the system control unit 106 performs the process in step S117.

The electronic apparatus 100 according to the present invention is not limited to the electronic apparatus 100 described in the first exemplary embodiment. The power supply apparatus according to the exemplary embodiment of the present invention is also not limited to the power supply apparatus described in the first exemplary embodiment. The external apparatus 200 according to the exemplary embodiment of the present invention is also not limited to the external apparatus described in the first exemplary embodiment. The electronic apparatus, the power supply apparatus, and the external apparatus according to the exemplary embodiment of the present invention can be realized by a system composed of a plurality of apparatuses.

The processes performed by the electronic apparatus and the functions of the electronic apparatus described in the first exemplary embodiment can be realized by computer programs. In this case, the computer programs according to the exemplary embodiment of the present invention can be executed by a computer including a central processing unit (CPU) to realize the various functions described in the first exemplary embodiment.

The computer programs according to the exemplary embodiment of the present invention can realize the various processes and functions described in the first exemplary embodiment using an operating system (OS) operated on the computer.

The processes performed by the power supply apparatus and the functions of the power supply apparatus described in the first exemplary embodiment can be realized by the computer programs. In this case, the computer programs according to the present invention can be executed by a computer to realize the various functions described in the first exemplary embodiment.

The computer programs according to the present invention are read from a computer-readable storage medium and executed by the computer. A hard disk device, an optical disc, a compact disc read-only memory (CD-ROM), a compact disc readable (CD-R), a memory card, and a read only memory (ROM) may be used as the computer readable storage medium. The computer programs according to the present invention may be provided for the computer from the external apparatus via the communication interface and executed by the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-269333 filed Dec. 8, 2011, which is hereby incorporated by reference herein in its entirety.

What is claimed is:

1. An electronic apparatus comprising:
a power controller that controls power supplied to the electronic apparatus;
a first power receiving unit that wirelessly receives power from a power supply external apparatus; and
a control unit that controls an operation of the electronic apparatus so that either of power received by the first power receiving unit from the power supply external apparatus or power received by a second power receiving unit from the power supply external apparatus is output to the power controller, wherein the second power receiving unit is included in a power receiving external apparatus configured to be connected to the electronic apparatus and configured to wirelessly receives power from the power supply external apparatus,
wherein, if the power received by the first power receiving unit from the power supply external apparatus is output to the power controller, the control unit transmits, to the power supply external apparatus, control data for controlling supply of power from the power supply external apparatus based on a mode of the electronic apparatus, and
wherein, if the power receiving external apparatus including the second power receiving unit is connected to the electronic apparatus, the control unit (i) controls the operation of the electronic apparatus so that power received by the first power receiving unit from the power supply external apparatus is not output to the power controller and power received by the second power receiving unit from the power supply external apparatus is output to the power controller, and (ii) transmits, to the power supply external apparatus, control data for controlling supply of power from the power supply external apparatus so that power is received by the second power receiving unit.

2. The electronic apparatus according to claim 1, wherein, if the electronic apparatus is in a predetermined mode, the control unit transmits, to the power supply external apparatus, control data for controlling the power supply external apparatus to stop supplying of power.

3. The electronic apparatus according to claim 2, wherein the predetermined mode includes at least one of a shooting mode, a moving image recording mode, and a direction detection mode.

4. The electronic apparatus according to claim 1, wherein, if the electronic apparatus is in a predetermined mode, the control unit transmits, to the power supply external apparatus, control data for changing a resonance frequency of the power supply external apparatus.

5. The electronic apparatus according to claim 1, wherein, if the electronic apparatus is not in a predetermined mode, the control unit transmits, to the power supply external apparatus, control data for controlling the power supply external apparatus to increase power for supplying to the electronic apparatus.

6. The electronic apparatus according to claim 1, wherein the control unit transmits again, to the power supply external apparatus, control data for controlling supply of power from the power supply external apparatus based on the mode of the electronic apparatus if the mode of the electronic apparatus is changed.

7. The electronic apparatus according to claim 1, wherein, if the electronic apparatus is connected to the power receiving external apparatus, the control unit transmits, to the power supply external apparatus, control data for controlling the power supply external apparatus to increase power for supplying to the electronic apparatus.

8. The electronic apparatus according to claim 7, wherein the control unit performs a predetermined process based on power received using one of the first power receiving unit and the second power receiving unit, wherein the predetermined process includes a process for charging a battery connected to the electronic apparatus.

9. The electronic apparatus according to claim 7, wherein the control unit performs a predetermined process based on power received using one of the first power receiving unit and the second power receiving unit, wherein the predetermined process includes a playback process.

10. The electronic apparatus according to claim 7, wherein the control unit performs a predetermined process based on power received using one of the first power receiving unit and the second power receiving unit, wherein the predetermined process includes a shooting process.

11. The electronic apparatus according to claim 7, wherein the control unit performs a predetermined process based on power received using one of the first power receiving unit and the second power receiving unit, wherein the predetermined process includes a direction detecting process.

12. The electronic apparatus according to claim 1, wherein, if power is to be received from the power supply external apparatus using the first power receiving unit, the control unit transmits second control data to the power supply external apparatus if the electronic apparatus is in a predetermined mode, and transmits first control data to the power supply external apparatus if the electronic apparatus is not in the predetermined mode, wherein the first control data is for controlling the power supply external apparatus so that power is to be received using the first power receiving unit, and the second control data is different from the first control data and is for controlling the power supply external apparatus so that power is to be received using the first power receiving unit so as not to inhibit an operation of the electronic apparatus.

13. The electronic apparatus according to claim 1, wherein the first power receiving unit is disposed on a bottom surface of the electronic apparatus.

14. The electronic apparatus according to claim 13, wherein the power receiving external apparatus is connected to the bottom surface of the electronic apparatus.

15. The electronic apparatus according to claim 13, wherein, in a case where the power receiving external apparatus is connected to the electronic apparatus, a top surface of the power receiving external apparatus is connected to the bottom surface of the electronic apparatus.

16. The electronic apparatus according to claim 15, wherein the second power receiving unit is disposed on a bottom surface of the power receiving external apparatus.

17. A method for controlling an electronic apparatus having a power controller that controls power supplied to the electronic apparatus, the method comprising:
wirelessly receiving power by a first power receiving unit from a power supply external apparatus; and
controlling an operation of the electronic apparatus so that either of power received by the first power receiving unit from the power supply external apparatus or power received by a second power receiving unit from the power supply external apparatus is output to the power controller, wherein the second power receiving unit is included in a power receiving external apparatus configured to be connected to the electronic apparatus and configured to wirelessly receives power from the power supply external apparatus,
wherein, if the power received by the first power receiving unit from the power supply external apparatus is output to the power controller, controlling includes transmitting, to the power supply external apparatus, control data for controlling supply of power from the power supply external apparatus based on a mode of the electronic apparatus, and
wherein, if the power receiving external apparatus including the second power receiving unit is connected to the electronic apparatus, controlling includes (i) controlling the operation of the electronic apparatus so that power received by the first power receiving unit from the power supply external apparatus is not output to the power controller and power received by the second power receiving unit from the power supply external apparatus is output to the power controller, and (ii) transmitting, to the power supply external apparatus, control data for controlling supply of power from the power supply external apparatus so that power is received by the second power receiving unit.

18. An electronic apparatus comprising:
a power controller that controls power supplied to the electronic apparatus;
a first power receiving unit that wirelessly receives power from an power supply external apparatus; and
a control unit that controls an operation of the electronic apparatus so that:
(i) in a first state in which a power receiving external apparatus is not connected to the electronic apparatus, power received by the first power receiving unit from the power supply external apparatus is output to the power controller, (ii) in a second state in which a power receiving external apparatus including a second power receiving unit for receiving power from the power supply external apparatus is connected to the electronic apparatus, the power received by the first power receiving unit from the power supply external apparatus is not output to the power controller and power received by the second power receiving unit from the power supply external apparatus is output to the power controller, and (iii) in a third state in which a power receiving external apparatus that does not include the second power receiving unit is connected to the electronic apparatus, the power received by the first power receiving unit from the power supply external apparatus is output to the power controller.

19. The electronic apparatus according to claim 18,
wherein, if power is to be received from the power supply external apparatus using the first power receiving unit, the control unit transmits, to the power supply external apparatus, control data for controlling supply of power from the power supply external apparatus based on a mode of the electronic apparatus, and
wherein, if the power receiving external apparatus including the second power receiving unit is connected to the electronic apparatus, and power is to be received from the power supply external apparatus using the second power receiving unit, the control unit transmits, to the power supply external apparatus, control data for controlling supply of power from the power supply external apparatus so that power is to be received using the second power receiving unit.

20. The electronic apparatus according to claim 19, wherein, if power is to be received from the power supply external apparatus using the first power receiving unit, the control unit transmits second control data to the power supply external apparatus if the electronic apparatus is in a predetermined mode, and transmits first control data to the power supply external apparatus if the electronic apparatus is not in the predetermined mode, wherein the first control data is for controlling the power supply external apparatus so that power is to be received using the first power receiving unit, and the second control data is different from the first control data and is for controlling the power supply external apparatus so that power is to be received using the first power receiving unit so as not to inhibit an operation of the electronic apparatus.

21. The electronic apparatus according to claim 18, wherein the control unit determines whether the power receiving external apparatus connected to the electronic apparatus includes the second power receiving unit.

22. The electronic apparatus according to claim 21, wherein the control unit determines whether the power receiving external apparatus connected to the electronic apparatus includes the second power receiving unit, by inquiring of the power receiving external apparatus.

23. The electronic apparatus according to claim 18, wherein the control unit transmits, to the power supply external apparatus, control data for controlling supply of power from the power supply external apparatus to increase power supplied from the power supply external apparatus in the third state to be larger than power supplied from the power supply external apparatus in the first state.

24. A method for controlling an electronic apparatus having a power controller that controls power supplied to the electronic apparatus, the method comprising:
wirelessly receiving power by a first power receiving unit from a power supply external apparatus; and controlling an operation of the electronic apparatus so that:

(i) in a first state in which a power receiving external apparatus is not connected to the electronic apparatus, power received by the first power receiving unit from the power supply external apparatus is output to the power controller, (ii) in a second state in which a power receiving external apparatus including a second power receiving unit for receiving power from the power supply external apparatus is connected to the electronic apparatus, the power received by the first power receiving unit from the power supply external apparatus is not output to the power controller and power received by the second power receiving unit from the power supply external apparatus is output to the power controller, and (iii) in a third state in which a power receiving external apparatus that does not include the second power receiving unit is connected to the electronic apparatus, the power received by the first power receiving unit from the power supply external apparatus is output to the power controller.

* * * * *